United States Patent
Krueger et al.

(10) Patent No.: US 10,683,371 B2
(45) Date of Patent: Jun. 16, 2020

(54) DEVICE FOR PRODUCING POLY(METH)ACRYLATE IN POWDER FORM

(71) Applicant: BASF SE, Ludwigshafen am Rhein (DE)

(72) Inventors: Marco Krueger, Mannheim (DE); Karl Possemiers, 'S Gravenwezel (BE); Gerald Gruenewald, Antwerp (BE); Juergen Freiberg, Lampertheim (DE); Markus Muehl, Mommenheim (DE)

(73) Assignee: BASF SE, Ludwigshafen (DE)

( * ) Notice: Subject to any disclaimer, the term of this patent is extended or adjusted under 35 U.S.C. 154(b) by 72 days.

(21) Appl. No.: 15/773,591

(22) PCT Filed: Nov. 15, 2016

(86) PCT No.: PCT/EP2016/077774
§ 371 (c)(1),
(2) Date: May 4, 2018

(87) PCT Pub. No.: WO2017/085081
PCT Pub. Date: May 26, 2017

(65) Prior Publication Data
US 2018/0319906 A1 Nov. 8, 2018

(30) Foreign Application Priority Data
Nov. 17, 2015 (EP) ..................................... 15194980

(51) Int. Cl.
*C08F 2/01* (2006.01)
*B01J 4/00* (2006.01)
(Continued)

(52) U.S. Cl.
CPC .................. *C08F 2/01* (2013.01); *B01J 2/16* (2013.01); *B01J 4/002* (2013.01); *B01J 19/24* (2013.01);
(Continued)

(58) Field of Classification Search
USPC .......................... 526/918, 920, 921; 422/147
See application file for complete search history.

(56) References Cited

U.S. PATENT DOCUMENTS 3,551,403 A * 12/1970 Delbouille ........... B01J 19/0006
526/59
2009/0214395 A1   8/2009 Parrish et al.

FOREIGN PATENT DOCUMENTS

WO   WO-2011/026876 A1   3/2011

OTHER PUBLICATIONS

Vee-Ball Valves Product Bulletin, Fisher Controls International LLC, 20 pages (Sep. 2015) (Year: 2015).*
(Continued)

Primary Examiner — Fred M Teskin
(74) Attorney, Agent, or Firm — Marshall, Gerstein & Borun LLP

(57) ABSTRACT

The invention relates to an apparatus for producing pulverulent poly(meth)acrylate, comprising a reactor for droplet polymerization having an apparatus for dropletization of a monomer solution for the preparation of the poly(meth)acrylate having holes through which the monomer solution is introduced, an addition point for a gas above the apparatus for dropletization, at least one gas withdrawal point on the circumference of the reactor, a fluidized bed and an apparatus for product discharge from the fluidized bed. The apparatus for product discharge comprises a discharge apparatus, with a backup segment (39) disposed above the discharge apparatus.

16 Claims, 1 Drawing Sheet

(51) Int. Cl.
*C08F 2/34* (2006.01)
*B01J 19/24* (2006.01)
*B01J 2/16* (2006.01)
*B01J 8/24* (2006.01)
*C08F 2/12* (2006.01)
*C08F 2/14* (2006.01)
*C08F 20/14* (2006.01)

(52) U.S. Cl.
CPC ............ *B01J 19/2405* (2013.01); *C08F 2/12* (2013.01); *C08F 2/34* (2013.01); *C08F 20/14* (2013.01); *B01J 2219/0072* (2013.01); *B01J 2219/00414* (2013.01); *B01J 2219/185* (2013.01)

(56) References Cited

OTHER PUBLICATIONS

International Application No. PCT/EP2016/077774, International Search Report and Written Opinion, dated Jan. 23, 2017.

\* cited by examiner

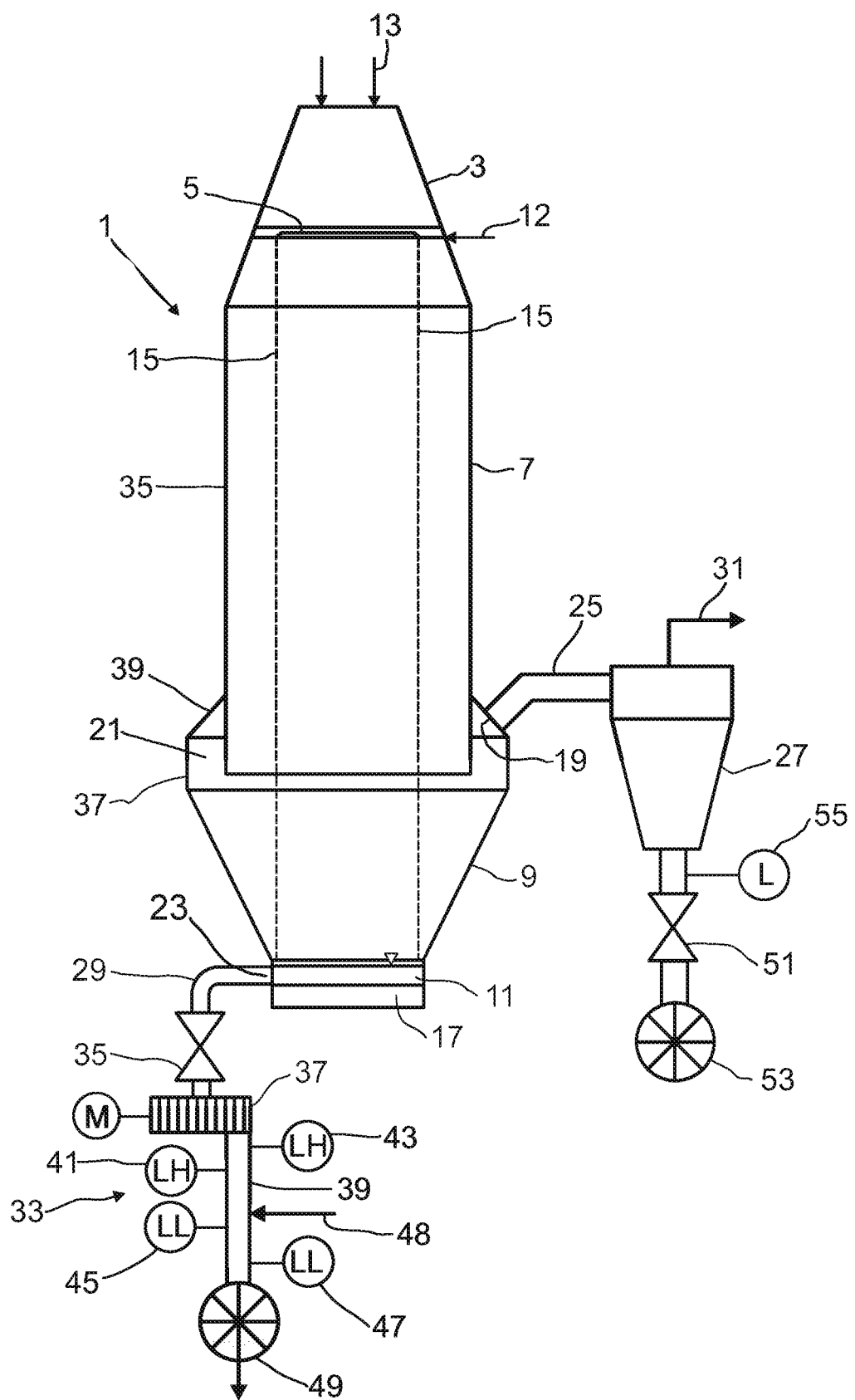

US 10,683,371 B2

1

DEVICE FOR PRODUCING POLY(METH)ACRYLATE IN POWDER FORM

CROSS-REFERENCE TO RELATED APPLICATIONS

This is the U.S. national phase of International Application No. PCT/EP2016/077774, filed Nov. 15, 2016, which claims the benefit of European Patent No. 15194980.7, filed on Nov. 17, 2015.

The invention proceeds from an apparatus for producing pulverulent poly(meth)acrylate, comprising a reactor for droplet polymerization having an apparatus for dropletization of a monomer solution for the preparation of the poly(meth)acrylate having holes through which the monomer solution is introduced, an addition point for a gas above the apparatus for dropletization, at least one gas withdrawal point on the circumference of the reactor, a fluidized bed and an apparatus for product discharge from the fluidized bed.

Poly(meth)acrylates find use especially as water-absorbing polymers which are used, for example, in the production of diapers, tampons, sanitary napkins and other hygiene articles, or else as water-retaining agents in market gardening.

The properties of the water-absorbing polymers can be adjusted via the level of crosslinking. With increasing level of crosslinking, there is a rise in gel strength and a fall in absorption capacity. This means that centrifuge retention capacity decreases with rising absorption under pressure, and the absorption under pressure also decreases again at very high levels of crosslinking.

To improve the performance properties, for example liquid conductivity in the diaper and absorption under pressure, water-absorbing polymer particles are generally postcrosslinked. This only increases the level of crosslinking at the particle surface, and in this way it is possible to at least partly decouple absorption under pressure and centrifuge retention capacity. This postcrosslinking can be performed in aqueous gel phase. In general, however, ground and sieved polymer particles are surface coated with a postcrosslinker, thermally postcrosslinked and dried. Crosslinkers suitable for this purpose are compounds which comprise at least two groups which can form covalent bonds with the carboxylate groups of the hydrophilic polymer.

Different processes are known for production of the water-absorbing polymer particles. For example, the monomers and any additives used for production of poly(meth) acrylates can be added to a mixing kneader, in which the monomers react to give the polymer. Rotating shafts with kneading bars in the mixing kneader break up the polymer formed into chunks. The polymer withdrawn from the kneader is dried and ground and sent to further processing. In an alternative variant, the monomer is introduced in the form of a monomer solution which may also comprise further additives into a reactor for droplet polymerization. On introduction of the monomer solution into the reactor, it disintegrates into droplets. The mechanism of droplet formation may be turbulent or laminar jet disintegration, or else dropletization. The mechanism of droplet formation depends on the entry conditions and the physical properties of the monomer solution. The droplets fall downward in the reactor, in the course of which the monomer reacts to give the polymer. In the lower region of the reactor is a fluidized bed into which the polymer particles formed from the droplets by the reaction fall. Further reaction then takes place in the fluidized bed. Corresponding processes are described, for example, in WO-A 2006/079631, WO-A 2008/086976, WO-A 2007/031441, WO-A 2008/040715, WO-A 2010/003855 and WO-A 2011/026876.

In the reactors for droplet polymerization described, gas is added at two points. A first gas stream is introduced above the apparatus for dropletization and a second gas stream from below through the fluidized bed. These gas streams have opposing flow directions. The gas is drawn off from the reactor via the annular duct which is formed by the reactor jacket which projects into the region with decreasing hydraulic diameter. In this case, the entire gas volume supplied to the reactor has to be conducted away. This leads to high gas velocities in the region of the annular duct, and the gas velocities can be so high that polymer material is entrained with the gas through the annular duct. This leads firstly to a reduction in the yield; secondly, there is a risk that the entrained particles can stick to walls of the annular duct and the downstream gas-conducting lines as a result of as yet incompletely reacted monomer solution and thus lead to unwanted deposits.

In order to avoid the formation of an explosive mixture in the reactor, the gas used is generally nitrogen. In the case of standard apparatuses for product discharge which remove the solids produced, for example when star feeders are used, it is typically the case that a portion of the gas is also lost continuously from the reactor, or that gas, especially air, penetrates into the reactor from connected plant components, according to the pressure gradient that exists. Especially in the case of an atmosphere in the reactor that is different than air, for example when nitrogen or else other gases that are inert towards the components present in the reactor are used, however, such a loss or the penetration of air and oxygen into the reactor is undesirable since correspondingly elevated consumption volumes of inert gas have to be supplied to the system in order to keep the reactor within the desired inert range, the inert range being defined by a given maximum oxygen concentration.

BRIEF DESCRIPTION OF THE DRAWING

The FIGURE shows a schematic diagram of an apparatus for producing pulverulent poly(meth)acrylate.

It is therefore an object of the present invention to provide an apparatus for producing pulverulent poly(meth)acrylate comprising a reactor for droplet polymerization, in which the consumption of inert gas in the reactor is minimized.

The object is achieved by an apparatus for producing pulverulent poly(meth)acrylate, comprising a reactor for droplet polymerization having an apparatus for dropletization of a monomer solution for the preparation of the poly(meth)acrylate having holes through which the monomer solution is introduced, an addition point for a gas above the apparatus for dropletization, at least one gas withdrawal point on the circumference of the reactor, a fluidized bed and an apparatus for product discharge from the fluidized bed, wherein the apparatus for product discharge comprises a discharge apparatus, with a backup segment disposed above the discharge apparatus.

The backup segment above the discharge apparatus serves as a gas barrier which minimizes the volume of gas which is withdrawn through the discharge apparatus together with the solids, or, according to a pressure gradient that exists, the gas, especially air, penetrating into the reactor. The solids collect in the backup segment, and the height of the column of solids and the resultant pressure reduces the size of the interspaces between the individual solid particles and hence also reduces the gas volume which is then discharged together with the solids. In the event of an inverse pressure gradient, the column of solids establishes a sufficient counterpressure that minimizes the penetration of gas into the reactor.

A reactor for droplet polymerization generally comprises a head with an apparatus for dropletization of a monomer solution, a middle region through which the dropletized monomer solution falls to be converted into polymer, and a fluidized bed into which the polymer droplets fall. The fluidized bed concludes the region of the reactor with decreasing hydraulic diameter at the lower end.

In order that the monomer solution exiting the apparatus for dropletization is not sprayed onto the wall of the reactor, and in order at the same time to configure the reactor advantageously both in terms of statics and in terms of material costs, it is preferable to form the head of the reactor in the shape of a frustocone and to position the apparatus for dropletization in the frustoconical head of the reactor.

The frustoconical configuration of the head of the reactor makes it possible to economize on materials compared to a cylindrical configuration. Moreover, a frustoconical head improves the structural stability of the reactor. A further advantage is that the gas which is introduced at the head of the reactor has to be supplied through a relatively small cross section and subsequently, due to the frustoconical configuration, flows downward in the reactor without significant vortexing. The vortexing that may occur in the case of a cylindrical configuration of the reactor in the head region and a gas feed in the middle of the reactor has the disadvantage that droplets that are entrained with the gas flow may be transported against the wall of the reactor because of the vortexing and hence may contribute to fouling.

In order to keep the height of the reactor as low as possible, it is further advantageous when the apparatus for dropletization of the monomer solution is disposed as far upward as possible in the frustoconically configured head. This means that the apparatus for dropletization of the monomer solution is disposed at the height in the frustoconically configured head at which the diameter of the frustoconically configured head is roughly the same as the diameter of the apparatus for dropletization.

In order to prevent the monomer solution which exits the apparatus for dropletization in the region of the outermost holes from being sprayed against the wall of the frustoconically configured head, it is particularly preferable when the hydraulic diameter of the frustoconically configured head, at the height at which the apparatus for dropletization is disposed, is 2% to 30%, more preferably 4% to 25%, and more particularly 5% to 20%, greater than the hydraulic diameter of the area enclosed by the shortest line connecting the outermost holes. The somewhat greater hydraulic diameter of the head additionally ensures that droplets, even below the reactor head, do not prematurely hit the reactor wall and adhere thereto.

Above the apparatus for dropletization of the monomer solution there is an addition point for gas, and gas and droplets therefore flow concurrently through the reactor from top to bottom. Since the fluidized bed is in the lower region of the reactor, the effect of this is that gas flows in the opposite direction from the bottom upward in the lower region of the reactor. Since gas is introduced into the reactor both from the top and from the bottom, the gas needs to be withdrawn between the apparatus for dropletization of the monomer solution and the fluidized bed. According to the invention, the gas withdrawal point is positioned at the transition from the reactor jacket to the region having decreasing hydraulic diameter in the direction of the fluidized bed.

In order to be able to adjust the volume of solids in the fluidized bed, an adjustable weir, for example, is disposed at the solids withdrawal point in the fluidized bed. In that case, the solids, when they reach the upper edge of the weir, pass over the weir and into the apparatus for product discharge. It is possible to adjust the mean residence time of the polymer particles in the fluidized bed and hence the period for postcrosslinking via the height of the fluidized bed.

In the region with decreasing hydraulic diameter, the hydraulic diameter decreases from the top downward from the gas withdrawal point in the direction of the fluidized bed. The decrease in the hydraulic diameter is preferably linear, such that the region having decreasing hydraulic diameter takes the form of an upturned frustocone.

The hydraulic diameter $d_h$ is defined as:

$$d_h = 4 \cdot A/C$$

where A is area and C is circumference. Using the hydraulic diameter renders the configuration of the reactor independent of the shape of the cross-sectional area. This area may, for example, be circular, rectangular, in the shape of any polygon, oval or elliptical. However, preference is given to a circular cross-sectional area.

In order to prevent an excessively large amount of polymer being withdrawn from the backup segment, and in order, in addition, to prevent overfilling of the backup segment or the fluidized bed, it is preferable when the backup segment has at least one upper sensor to detect a maximum fill level and/or at least one lower sensor to detect a minimum fill level. With suitable closed-loop control of the fill level, polymer is withdrawn via the discharge apparatus when the fill level present in the backup segment reaches the upper sensor for detection of the maximum fill level and the polymer withdrawal is ended as soon as the fill level reaches the lower sensor for detection of the minimum fill level. In addition, fully continuous closed-loop control of the discharge rate is also possible by suitable stepwise adjustment thereof.

In a preferred embodiment, a closed-loop fill level control system is included, in which the upper sensor detects a first upper fill level and, when the latter is attained, the feed is reduced, and detects a second upper fill level and, when the latter is attained, the feed is closed, and the lower sensor detects a first lower fill level and, when the latter is attained, the product flow out of the apparatus for product discharge is reduced, and detects a second lower fill level and, when the latter is attained, the apparatus for product discharge is closed, such that no product is withdrawn. Such closed-loop control of the fill level with detection of a first and second upper fill level and of a first and second lower fill level makes it possible to operate the apparatus for product discharge in such a way that product is withdrawn continuously from the reactor. Interruption of the product withdrawal is required only when such a small volume of polymer is being produced that the backup segment cannot be filled up again sufficiently quickly even with a low withdrawal rate. This can occur, for example, in the event of interruption of the monomer supply. In addition, it is also possible to use continuous fill level sensors which, instead of limiting fill states, measure and transmit a continuous fill level signal. With the continuous measurement signal, closed-loop control of the discharge rate directly to a desired fill level, for example 50%, is possible. Suitable continuous fill level sensors are, for example, capacitative cable probes, radar or microwave instruments, and radioactive fill level meters.

In order, for example, in the case of an excessively filled backup segment, to prevent further polymer from being able to run into the backup segment before it has been emptied via the discharge apparatus for further acceptance of polymer, it is possible to dispose a closure element above the backup segment. The closure element may additionally also be utilized for adjusting the amount of polymer material which flows into the backup segment. Suitable closure elements which may be disposed above the backup segment are, for example, slide vanes, flaps, ball valves, segmented ball valves or other valves. Preferred closure elements are segmented ball valves or slide vanes.

For comminution of agglomerates or lumps formed in the reactor, which can arise, for example, as a result of deposits being chipped away, in a preferred embodiment, a solids comminutor is disposed above the backup segment. Suitable solids comminutors are especially lump breakers, and suitable lump breakers here are especially finger breakers having a breaking grid and rotating breaking tool. As well as a finger breaker having a breaking grid and rotating breaking tool, however, it is also possible to use any other lump breaker known to those skilled in the art as a solids comminutor. As an alternative to a lump breaker, it is also possible to use any other solids comminutors, for example mills or grinding systems.

When a solids comminutor and a closure element are used, it is advantageous to dispose the closure element above the solids comminutor, such that the solids comminutor is between the closure element and the backup segment. In this way, it is possible, for example, in the event of blockage of the solids comminutor, to interrupt the polymer supply into the solids comminutor and clean or repair it. It is also possible in the case of excessive filling of the solids comminutor, which can result, for example, from addition of large lumps, to interrupt the polymer supply in order first to fully comminute the lumps before further material is fed into the solids comminutor.

The discharge apparatus used is preferably an apparatus with which the polymer can be withdrawn in a controlled manner. As well as a polymer withdrawal and an interruption of the polymer withdrawal, it should also be possible to adjust the rate at which the polymer is withdrawn via the discharge apparatus. This allows the fill level in the backup segment to be kept substantially constant irrespective of the mass flow rate of polymers flowing into the backup segment, for example in the event of detection of the first and second upper fill level and of the first and second lower fill level between the first upper fill level and the first lower fill level in each case, by increasing the discharge rate in the case of an increasing fill level and reducing it in the case of a decreasing fill level.

Suitable discharge apparatuses are, for example, a star feeder, a flap, a screw conveyor or a segmented ball valve. Particular preference is given to the star feeder.

To avoid condensation in the backup segment and to prevent bridge formation which can block the backup segment, one particular cause of bridge formation being condensation, in one embodiment of the invention, a gas supply is disposed in the backup segment in order to introduce dry gas into the backup segment. The introduction of gas into the backup segment prevents concentration of the moisture that arises through further drying of the warm product in the gas phase and hence condensation, such that no solids bridges can arise. The gas used is preferably dry or demoisturized gas. Suitable gases are inert toward the monomers used and the polymers. Particular preference is given to using dry nitrogen as the gas.

In order to prevent formation of deposits in the region of the apparatus for product discharge that can grow and can thus block the apparatus for product discharge, the apparatus for product discharge is preferably heatable. It has been found that heating can prevent or at least greatly reduce the formation of deposits which can be the result especially of caking of incompletely polymerized or moist particles. Preferably, for product discharge, the solids comminutor, the backup segment and/or the discharge apparatus has, for heating of the apparatus, electrical heating, a jacket or externally mounted heating coils, it being possible for a heating medium to flow through the jacket or the heating coils. The heating medium used may be any heating medium known to those skilled in the art. Examples of suitable heating media include thermal oils, water or steam. Particular preference is given to using steam as heating medium.

In order to avoid discharge of solids from the process together with the gas stream withdrawn from the reactor above the fluidized bed and thus a reduction in the yield, the gas withdrawal point is preferably connected to an apparatus for fine dust removal. Examples of suitable apparatuses for fine dust removal are fine dust filters or cyclones. A particularly preferred apparatus for fine dust removal is a cyclone. The solids removed in the apparatus for fine dust removal can then be withdrawn from the apparatus for fine dust removal and either recycled into the process or withdrawn as product. If the size of the solid particles withdrawn does not meet the desired specification, they can be reprocessed. In the case of excessively large particles, it is possible, for example, to comminute them in a suitable solids comminutor, for example a mill. Excessively small particles can be recycled into the process, such that they react or agglomerate with further monomer and increase in size.

In order to prevent inert gas from being able to escape from the reactor via the withdrawal point for the solids from the fine dust removal or, according to the pressure gradient, to prevent air from being able to penetrate into the reactor at this point, in a preferred embodiment, the apparatus for fine dust removal, especially the cyclone, has a solids discharge comprising a discharge apparatus and, above the discharge apparatus, a closure element. The closure apparatus can be used to close the solids discharge from the apparatus for fine dust removal, such that solids are only withdrawn when a sufficiently large amount is present. By virtue of the only occasional withdrawal of solids, the unwanted discharge of inert gas or the unwanted penetration of air into the reactor can be minimized. The closure element additionally enables backup of solids, such that this also gives additional assurance against gas withdrawal or the penetration of air into the reactor. The closure element can especially be closed again before all the solids have been withdrawn, such that this can minimize escape of gas from the reactor or the penetration of air into the reactor.

Suitable discharge apparatus from the solids discharge of the apparatus for fine dust separation, just like suitable discharge apparatus from the apparatus for product withdrawal from the reactor, is a star feeder, a flap, a conveying screw or a segmented ball valve. The closure element in the solid discharge of the apparatus for fine dust separation may, for example, be a flap, a ball valve, a segmented ball valve, a slide vane or another valve.

In a preferred embodiment, at least one fill level sensor is positioned above the closure element. With the fill level sensor, it is possible to detect when the amount of solids which has been separated out in the apparatus for fine dust removal is so great that it has to be withdrawn in order to assure undisrupted working of the apparatus for fine dust removal.

In order to avoid contamination of the product withdrawn from the apparatus for product discharge and from the solids discharge of the apparatus for fine dust removal, and in order to supply it to possible downstream processing steps, the apparatus for product discharge and/or the solids discharge of the apparatus for fine dust removal preferably open(s) into a suction line which pneumatically conveys the pulverulent poly(meth)acrylate onward. The pneumatic conveying ensures that the poly(meth)acrylate does not come into contact with unwanted extraneous substances. More particularly, transport in a closed pipeline is possible. Instead of air, which is customarily used, it is possible to utilize an inert gas, especially nitrogen, for the pneumatic transport. Preference is given to the use of air as transport gas.

The reprocessing to which the poly(meth)acrylate is conveyed is any customary reprocessing operation for poly (meth)acrylates, for example a postcrosslinking, a postadditization, grinding, sieving or sifting to adjust the particle size, intermediate storage and packing of the poly(meth)acrylate.

One working example of the invention is shown in the FIGURE and is described in detail in the description which follows.

The sole FIGURE shows a schematic diagram of the apparatus of the invention.

A reactor 1 for droplet polymerization comprises a reactor head 3 which accommodates an apparatus for dropletization 5, a middle region 7 in which the polymerization reaction proceeds, and a lower region 9 having a fluidized bed 11 in which the reaction is concluded.

For performance of the polymerization reaction to prepare the poly(meth)acrylate, the apparatus for dropletization 5 is supplied with a monomer solution via a monomer feed 12. When the apparatus for dropletization 5 has a plurality of channels, it is preferable to supply each channel with the monomer solution via a dedicated monomer feed 12. The monomer solution exits through the holes, which are not shown in the FIGURE, in the apparatus for dropletization 5 and disintegrates into individual droplets which fall downward within the reactor. Through a first addition site for a gas 13 above the apparatus for dropletization 5, a gas, for example nitrogen or air, is introduced into the reactor 1. This gas flow supports the disintegration of the monomer solution exiting from the holes of the apparatus for dropletization 5 into individual droplets. In addition, the gas flow promotes lack of contact between the individual droplets and coalescence thereof to form larger droplets.

In order firstly to make the cylindrical middle region 7 of the reactor very short and additionally to avoid droplets hitting the wall of the reactor 1, the reactor head 3 is preferably conical, as shown here, in which case the apparatus for dropletization 5 is within the conical reactor head 3 above the cylindrical region. Alternatively, however, it is also possible to make the reactor cylindrical in the reactor head 3 as well, with a diameter as in the middle region 7. Preference is given, however, to a conical configuration of the reactor head 3. The position of the apparatus for dropletization 5 is selected such that there is still a sufficiently large distance between the outermost holes through which the monomer solution is supplied and the wall of the reactor to prevent the droplets from hitting the wall. For this purpose, the distance should at least be in the range from 50 to 1500 mm, preferably in the range from 100 to 1250 mm and especially in the range from 200 to 750 mm. It will be appreciated that a greater distance from the wall of the reactor is also possible. This has the disadvantage, however, that a greater distance is associated with poorer exploitation of the reactor cross section.

The lower region 9 concludes with a fluidized bed 11, into which the polymer particles formed from the monomer droplets fall during the fall. In the fluidized bed, further reaction proceeds to give the desired product. According to the invention, the outermost holes through which the monomer solution is dropletized are positioned such that a droplet falling vertically downward falls into the fluidized bed 11. This can be achieved, for example, by virtue of the hydraulic diameter of the fluidized bed being at least as large as the hydraulic diameter of the area which is enclosed by a line connecting the outermost holes in the apparatus for dropletization 5, the cross-sectional area of the fluidized bed and the area formed by the line connecting the outermost holes having the same shape and the centers of the two areas being at the same position in a vertical projection of one onto the other. The outermost position of the outer holes relative to the position of the fluidized bed 11 is shown in the FIGURE with the aid of a dotted line 15.

In order, in addition, to avoid droplets hitting the wall of the reactor in the middle region 7 as well, the hydraulic diameter at the level of the midpoint between the apparatus for dropletization and the gas withdrawal point is at least 10% greater than the hydraulic diameter of the fluidized bed.

The reactor 1 may have any desired cross-sectional shape. However, the cross section of the reactor 1 is preferably circular. In this case, the hydraulic diameter corresponds to the diameter of the reactor 1.

Above the fluidized bed 11, the diameter of the reactor 1 increases in the embodiment shown here, such that the reactor 1 widens conically from the bottom upward in the lower region 9. This has the advantage that polymer particles formed in the reactor 1 that hit the wall can slide downward into the fluidized bed 11 along the wall. To avoid caking, it is additionally possible to provide tappers, not shown here, on the outside of the conical part of the reactor, with which the wall of the reactor is set in vibration, as a result of which adhering polymer particles are detached and slide into the fluidized bed 11.

For gas supply for the operation of the fluidized bed 11, a gas distributor 17 present beneath the fluidized bed 11 blows the gas into the fluidized bed 11.

Since gas is introduced into the reactor 1 both from the top and from the bottom, it is necessary to withdraw gas from the reactor 1 at a suitable position. For this purpose, at least one gas withdrawal point 19 is disposed at the transition from the middle region 7 having constant cross section to the lower region 9 which widens conically from the bottom upward. In this case, the wall of the cylindrical middle region 7 projects into the lower region 9 which widens conically in the upward direction, the diameter of the conical lower region 9 at this position being greater than the diameter of the middle region 7. In this way, an annular duct 21 which encloses the wall of the middle region 7 is formed, into which the gas flows and can be drawn off through the at least one gas withdrawal point 19 connected to the annular duct 21.

The further-reacted polymer particles of the fluidized bed 11 are withdrawn via a product withdrawal point 23 in the region of the fluidized bed.

In order to remove any particles entrained by the gas withdrawal point 19 from the gas stream, the gas withdrawal point 19 is connected via a gas duct 25 to an apparatus for fine dust removal 27, for example a filter or a cyclone, preferably a cyclone. From the cyclone, it is then possible for the solid particles separated from the gas to be withdrawn via a solids withdrawal, and the gas which has been freed of solids via a gas takeoff 31.

For homogeneous gas withdrawal from the annular duct 21, it is preferable when several gas withdrawal points 19 are provided in homogeneous distribution over the circumference of the annular duct 21. In this case, it is possible that each gas withdrawal point 19 is connected to an apparatus for fine dust removal 27 or, alternatively, that each of several gas withdrawal points 19 are passed into an apparatus for fine dust removal 27. Preference is given, however, to such a configuration that every gas withdrawal point 19 is connected to a separate apparatus for fine dust removal 27.

In order to minimize the amount of inert gas which is discharged from the reactor 1 with the product or, according to the pressure gradient that exists, the amount of air which penetrates into the reactor, and thus to reduce the inert gas consumption for the process, the reactor 1 comprises an apparatus 33 for product discharge, comprising a backup segment 39 and a discharge apparatus 49. Product accumulates in the backup segment, and the backup of the product in the backup segment 39 results in compaction and reduction in the gas volume in the interspaces between the product particles. In addition, the backed-up product has a sealing effect, such that the gas volume which can flow out through the discharge apparatus 49 on withdrawal of the product is likewise minimized; suitable discharge apparatuses 49 are, for example, star feeders, flaps, conveying screws, ball valves or segmented ball valves.

In order to assure the sealing effect of the product in the backup segment 39, the latter has, in the preferred embodiment shown here, sensors for determining a first upper fill level 41, a second upper fill level 43, a first lower fill level 45 and a second lower fill level 47. For this purpose, on attainment of the first upper fill level, the withdrawal is accelerated and, on attainment of the second upper fill level, it is possible, for example with the aid of a closure element 35, to interrupt the supply of product to the backup segment, in order to prevent overfilling. In order, in addition, to prevent the fill level in the backup segment 39 from becoming too low, meaning that the sealing effect by the backed-up product can no longer be assured, on attainment of the first lower fill level 45, the withdrawal is slowed down, for example by reducing the speed of a star feeder used as discharge apparatus 49, and stopped when the second lower fill level 47 is attained. This ensures that product is always present in the backup segment.

To prevent bridge formation by the product backed up in the backup segment 39, it is possible to introduce gas into the backup segment 39 via a gas supply 48. The gas loosens the product in the backup segment 39, such that it cannot block the backup segment 39. In addition, use of dry gas achieves the effect that the gas atmosphere in the backup segment does not become too moist and hence condensation is prevented.

In order to comminute large particles which can arise, for example, through agglomeration of the product particles or as a result of caked material falling down, it is advantageous, as shown here, to use a solids comminutor 37, for example a lump breaker, above the backup segment 39. The comminution of lumps and agglomerates in the solids comminutor 37 also prevents the lumps or agglomerates from remaining suspended in the backup segment and blocking it or the discharge apparatus 49. When a solids comminutor 37 is provided, it is preferably positioned between the closure element 35 and the backup segment 39.

In order, in addition, to prevent inert gas from being able to exit via the solids discharge of the apparatus for fine dust separation 27 or, according to the pressure gradient that exists, air from being able to penetrate into the reactor, the solids discharge preferably likewise has a closure element 51 and a discharge apparatus 53. As long as the fill level in the apparatus for fine dust separation 27 is low, the closure element 51 remains closed. This prevents solids from being discharged and inert gas from being able to escape with the solids discharged or, according to the pressure gradient that exists, air and oxygen from being able to penetrate into the reactor. In addition, the effect of the closure element 51 is that the solids are backed up in the apparatus for fine dust removal 27, such that it likewise has a sealing effect. Only on attainment of a particular fill level, which can be detected, for example, with a fill level sensor 55, does the closure element 51, for example a valve, a slide vane, a ball valve, a segmented ball valve or a flap, open, and the solids can arrive at the discharge apparatus 53. The discharge apparatus 53 is, like the discharge apparatus 49 of the apparatus 33 for product withdrawal as well, preferably a star feeder, a flap, a conveying screw, a ball valve or a segmented ball valve.

As a result of the additional use of the closure element, the solids removed in the apparatus for fine dust removal 27 arrive in compacted form at the discharge apparatus 53, and so this minimizes the proportion of gas which can escape via the solids discharge of the apparatus for fine dust removal 27 in the solids withdrawal.

LIST OF REFERENCE NUMERALS 1 reactor
3 reactor head
5 apparatus for dropletization
7 middle region
9 lower region
11 fluidized bed
12 monomer feed
13 addition point for gas
15 position of the outermost holes in relation to the fluidized bed 11
17 gas distributor
19 gas withdrawal point
21 annular duct
23 product withdrawal point
25 gas duct
27 apparatus for fine dust removal
29 solids withdrawal
31 gas takeoff
33 apparatus for product discharge
35 closure element
37 solids comminutor
39 backup segment
41 first upper fill level
43 second upper fill level
45 first lower fill level
47 second lower fill level
48 gas supply
49 discharge apparatus
51 closure element
53 discharge apparatus
55 fill level sensor

The invention claimed is:

1. An apparatus for producing pulverulent poly(meth)acrylate, comprising a
reactor for droplet polymerization having an apparatus for dropletization of a monomer solution for the preparation of the poly(meth)acrylate having holes through which the monomer solution is introduced, an addition point for a gas above the apparatus for dropletization, at least one gas withdrawal point on the circumference of the reactor, a fluidized bed and an apparatus for product discharge from the fluidized bed, wherein the apparatus for product discharge comprises a discharge apparatus, with a backup segment disposed above the discharge apparatus, the backup segment serving as a gas barrier in that by accumulation of product a compaction results.

2. The apparatus according to claim 1, wherein the backup segment has an upper sensor for detecting a maximum fill level and a lower sensor for detecting a minimum fill level.

3. The apparatus according to claim 2, wherein a closed-loop fill level control system is included, in which the upper sensor detects a first upper fill level and, when the latter is attained, a feed is reduced, and detects a second upper fill level and, when the latter is attained, the feed is closed, and the lower sensor detects a first lower fill level and, when the latter is attained, the product flow out of the apparatus for product discharge is reduced, and detects a second lower fill level and, when the latter is attained, the apparatus for product discharge is closed, such that no product is withdrawn.

4. The apparatus according to claim 1, wherein a closure element is disposed above the backup segment.

5. The apparatus according to claim 1, wherein a solids comminutor is disposed above the backup segment.

6. The apparatus according to claim 5, wherein the solids comminutor is a lump breaker.

7. The apparatus according to claim 6, wherein the lump breaker is a finger breaker having a breaking grid and a rotating breaking tool.

8. The apparatus according to claim 1, wherein the discharge apparatus is a star feeder, a flap, a screw conveyor or a segmented ball valve.

9. The apparatus according to claim 1, wherein a gas supply is disposed in the backup segment in order to introduce gas into the backup segment.

10. The apparatus according to claim 1, wherein the apparatus for product discharge is heatable.

11. The apparatus according to claim 10, wherein the apparatus for product discharge is heated by virtue of a solids comminutor, the backup segment and/or the discharge apparatus having electrical heating, a jacket or externally mounted heating coils, it being possible for a heating medium to flow through the jacket or the heating coils.

12. The apparatus according to claim 1, wherein the gas withdrawal point is connected to an apparatus for fine dust removal and the apparatus for fine dust removal has a solids discharge comprising a discharge apparatus and, above the discharge apparatus, a closure element.

13. The apparatus according to claim 12, wherein the discharge apparatus from the solids discharge of the apparatus for fine dust separation is a star feeder, a flap, a conveying screw or a segmented ball valve.

14. The apparatus according to claim 12, wherein the closure element in the solids discharge of the apparatus for fine dust separation is a flap, a slide vane, a segmented ball valve or another valve.

15. The apparatus according to claim 12, wherein at least one fill level sensor is positioned above the closure element.

16. The apparatus according to claim 1, wherein the apparatus for product discharge and/or the solids discharge of an apparatus for fine dust removal open(s) into a suction line which pneumatically conveys the pulverulent poly(meth)acrylate onward.

* * * * *